United States Patent [19]

Flanigan

[11] Patent Number: 5,397,818

[45] Date of Patent: Mar. 14, 1995

[54] PROCESS FOR PRODUCING TIRE RUBBER MODIFIED ASPHALT CEMENT SYSTEMS AND PRODUCTS THEREOF

[75] Inventor: Theodore P. Flanigan, League City, Tex.

[73] Assignee: Neste/Wright Asphalt Products, Co., Channelview, Tex.

[21] Appl. No.: 188,329

[22] Filed: Jan. 26, 1994

[51] Int. Cl.$^6$ .................. C08L 95/00; C08J 11/06
[52] U.S. Cl. .................. 524/68; 524/59; 524/69; 524/71; 521/41; 521/44.5
[58] Field of Search ............ 524/59, 62, 68, 69, 524/71; 521/44.5, 41

[56] References Cited

U.S. PATENT DOCUMENTS

| | | | |
|---|---|---|---|
| 3,891,585 | 6/1975 | McDonald | 524/59 |
| 3,919,148 | 11/1975 | Winters et al. | 524/59 |
| 4,069,182 | 1/1978 | McDonald | 524/59 |
| 4,166,049 | 8/1979 | Huff | 521/44.5 |
| 4,358,554 | 11/1982 | Yan et al. | 524/62 |
| 4,430,464 | 2/1984 | Oliver | 524/59 |
| 4,588,634 | 5/1986 | Pagen et al. | 524/68 |
| 4,609,696 | 9/1986 | Wilkes | 524/59 |
| 5,270,361 | 12/1993 | Duong et al. | 524/59 |

FOREIGN PATENT DOCUMENTS

| | | | |
|---|---|---|---|
| 0248371 | 8/1987 | Germany | 524/62 |
| 1613455 | 12/1990 | Russian Federation | 524/41 |

*Primary Examiner*—Peter Szekely
*Attorney, Agent, or Firm*—Keck, Mahin & Cate

[57] ABSTRACT

A process for preparing an incorporated asphalt composition includes mixing ground tire rubber with distillation tower bottoms to form a wetted mixture of the ground tire rubber with the distillation tower bottoms, bombarding the wetted mixture of ground tire rubber and distillation tower bottoms with air at a temperature of about 350°–485° F. at about 6–15 psi pressure until the mixture is completely incorporated, and recovering the incorporated asphalt composition. The homogenized asphalt product is a two-member composition of distillation tower bottoms having ground tire rubber incorporated therein.

15 Claims, 1 Drawing Sheet

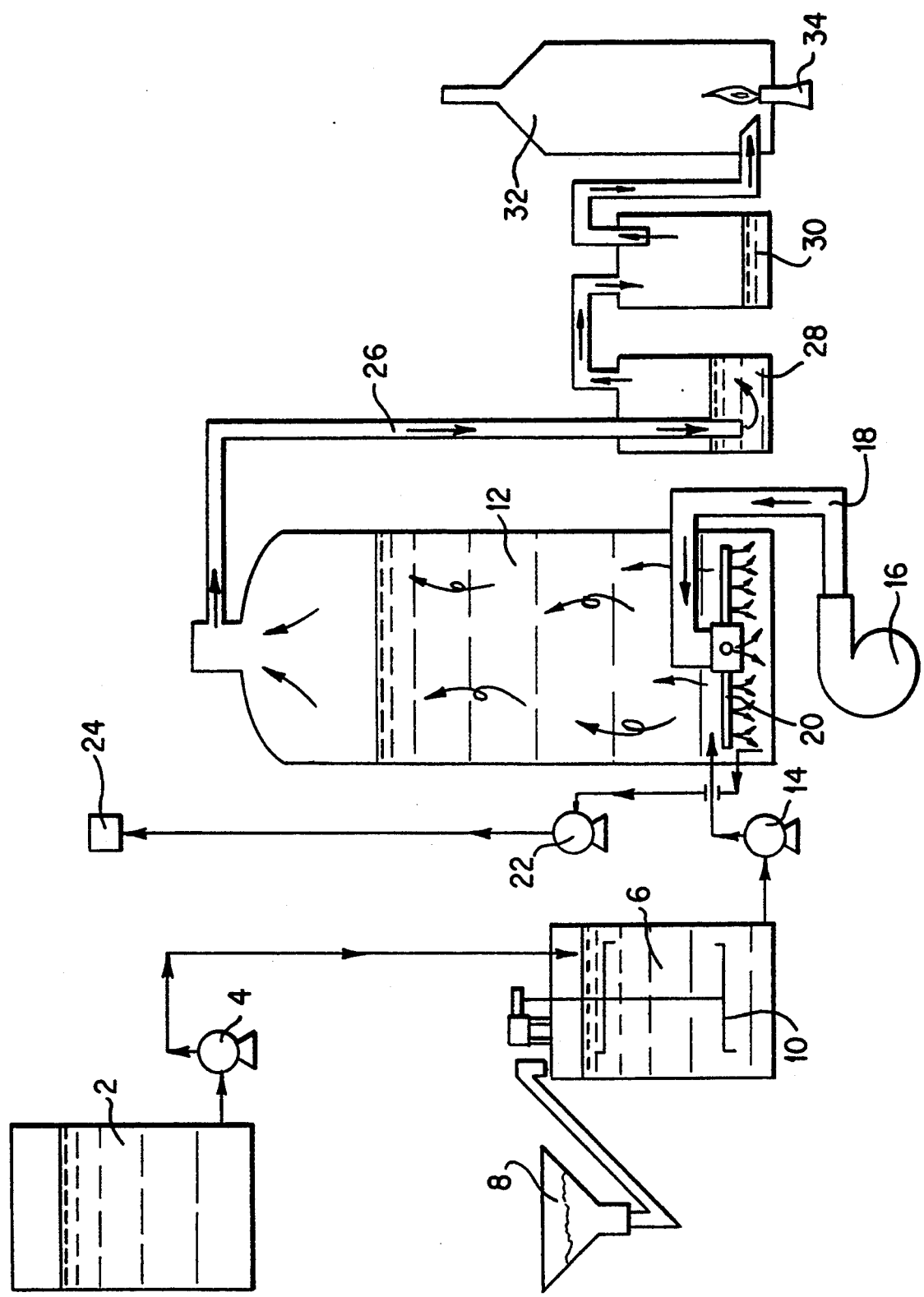

PROCESS FOR PRODUCING TIRE RUBBER MODIFIED ASPHALT CEMENT SYSTEMS AND PRODUCTS THEREOF

FIELD OF THE INVENTION

A process for preparing tire rubber modified asphalt cement systems by incorporating ground tire rubber into distillation tower bottoms using abrasive absorption to achieve an asphalt cement system, and products thereof.

BACKGROUND OF THE INVENTION

Processes for incorporating ground tire rubber into bituminous material to make asphalt cement systems suitable for paving, roofing and other uses have hitherto been unduly complex and thus costly in use. Known processes use additional constituents of the composition and additional process steps in an attempt to provide a homogenous system. Such attempts have not been successful.

Duong et al., U.S. Pat. No. 5,270,361, is directed to a process for making an asphalt composition which includes synthetic or natural rubber which may be in particles of up to one-half inch in thickness. Elemental selenium or an organo-selenium compound is added into the mixture to act as a substitute for the sulfur which is removed during the devulcanization process. The selenium or organo-selenium compound acts as a cross-linking agent. The composition is treated with pressurized air in a dehydrogenation reaction. In the dehydrogenation vessel, the dispersing device includes a pair of discs turning at 3600 rpm which promotes homogenization and acceleration of the dehydrogenation reaction. Elemental selenium or an organo-selenium compound is added into the homogenized composition and mixed in a static mixer. The asphalt composition is then recovered and stored in a container at about 150° to 175° C.

Wilkes, U.S. Pat. No. 4,609,696, describes a rubberized asphalt composition which is made by combining asphalt with a hydrocarbon oil to provide a homogenized asphalt-oil mixture or solution, combining the mixture with particulate rubber to provide a homogenous gel and emulsifying the gel by passing the asphalt-rubber-oil gel, with water, through a colloid mill.

Oliver, U.S. Pat. No. 4,430,464, describes a pavement binder composition in which rubber particles are digested in a bituminous material. McDonald, U.S. Pat. Nos. 4,069,182 and 3,891,585, describe an elastomeric pavement repair composition and a method for making the composition. Winters et al., U.S. Pat. No. 3,919,148, also describes an elastomeric paving material.

Pagen et al., U.S. Pat. No. 4,588,634 describes a roofing material using bitumen and ground tire rubber together with mineral stabilizer and an elastomeric polymer composition.

SUMMARY OF THE INVENTION

The invention provides a process for preparing tire rubber modified asphalt cement systems and products thereof which have only two components, distillation tower bottoms (DTB) and ground tire rubber (GTR). No chemicals or special aromatic oils or additives are needed in this process.

According to the process, a single stage of abrasive absorption accomplishes stable combination of the tire rubber and bituminous residue by bombarding with a high volume of air under pressure. The two components are combined into a new composite which is completely incorporated together and is stable. The incorporated asphalt composition product does not separate or degrade even over a long period of time. The asphalt composition is useful in the paving and roofing industries.

The process is a two-stage process including (a) a wetting process and (b) an abrasive absorption process, using a two-component blend of distillation tower bottoms (DTB) and ground tire rubber (GTR). No special blending is needed prior to or following the process of abrasive absorption. The abrasive absorption is carried out by bombarding with air at 2200 cfm at 10 psi with a beginning temperature of about 350° F. and an ending temperature of about 485° F. The total abrasive absorption time is about 2 to 6 hours.

The abrasive absorption is carried out in a reactor having a stationary air spider located at the bottom of the reactor. The base oil is distillation tower bottoms (DTB) which is the bituminous residue after vacuum distillation, atmospheric distillation, steam stripping of petroleum or other processes known to those skilled in the art. The ground tire rubber (GTR) is recycled rubber obtained from grinding scrap vulcanized rubber tires, tubes, etc. Ground tire rubber is loaded into the DTB in an amount ranging from 1% to 27%, preferably about 12–25%. The GTR may be sized from a powder grind (about 200 mesh or less) up to about 20 mesh. The air volume input through the stationary air distributing spider-shaped device may range from about 1600 to about 2800 cfm and from about 6 psi to about 15 psi, preferably about 2200 cfm at about 10 psi.

BRIEF DESCRIPTION OF THE DRAWING

The Figure illustrates, schematically, apparatus used in a process of the invention.

DETAILED DESCRIPTION OF THE PREFERRED EMBODIMENTS

The invention advantageously provides an asphalt composition which incorporates a bituminous residue, such as distillation tower bottoms (DTB) in a complete and integral mixture with ground tire rubber (GTR).

The two-component asphalt composition produced is simple and economical to prepare. According to the process of the invention, the ground tire rubber is "wetted" with the distillation tower bottoms and passed into an absorption vessel in which the wetted mixture is bombarded with a high volume of air which causes intimate mixing of the rubber molecules and bituminous molecules causing incorporation of the rubber into a complete and stable composition. The product is an asphalt composition in which the ground tire rubber is fully incorporated into the distillation tower bottoms. The resulting composition is stable and does not separate out. No additives need to be used. Only DTB and GTR are used in a preferred embodiment of the process. The asphalt composition has many uses, such as in the roofing or paving industries.

The Figure illustrates the process of the invention, schematically. Distillation tower bottoms (DTB) are stored in vessel 2. A charge of DTB is pumped by charge pump 4 into wetting vessel 6 together with a charge of ground tire rubber (GTR) fed from hopper 8. The GTR may be sized from a powder grade (about 200 mesh or less) up to about 20 mesh. The DTB and GTR are thoroughly mixed together using stirrer 10, thoroughly wetting the GTR with DTB. In a typical application, the GTR is present in a ratio of 1:99 to 27:33 with respect to DTB, preferably in a ratio of 12:88 to 25:75 with respect to DTB. The mixture from wetting vessel 6 is pumped into the absorption vessel 12 using reactor feed pump 14. Pressurized air is fed by pump 16 at 1600 to 2800 cfm and a pressure of 6 to 15 psi through conduit 18 and stationary spider device 20 which allows the pressurized air to enter the bottom of the absorption vessel 12. In a preferred embodiment, the air is pumped into the absorption vessel 12 through the stationary spider device 20 at 2200 cfm and 10 to 15 psi. As the air bombards the mixture in vessel 12, an abrasive absorption process takes place. The abrasive absorption process takes place by injecting air at, for example, 2200 cfm into the bottom of the vessel through the stationary air spider and maintaining the air flow at 10 psi throughout the process. The process starts with an absorption reactor temperature of 300° to 375° F. and the temperature is increased to 485° F. during the process. The temperature and airflow are maintained until the targeted softening point is achieved. The material may be sampled every 30 minutes, or as otherwise known to one skilled in the art. The duration of the process may be about 2 to 6 hours for reaching the targeted softening point. Once the targeted softening point is reached, the air and heat are shut off and the finished product, which is completely incorporated is transferred using the finished product pump 22 to finished product storage 24. Hydrocarbons released in the absorption vessel are passed to a hydrocarbon collection and vapor recovery area through conduit 26 to knockout tank 28 and condensate tank 30. In one example, any remaining uncondensed hydrocarbons are burned in incinerator 32 using gas fired burner 34 at a temperature of 1500° F.

Throughput of the process may be 300 to 400 tons per day using one reactor and one wetting vessel or otherwise as known to one skilled in the art. Other equipment may be used to achieve a similar result. The examples describe preferred embodiments.

A typical sample of DTB may have the following properties:

| | | |
|---|---|---|
| Viscosity at 140° F. (poises) | 15–50 ps | ASTM 2171 |
| Softening point of flint | 40–70° F. | ASTM D113 |
| Flash point, °F., min. COC | 560° F. | ASTM D92 |

EXAMPLE 1

In laboratory size equipment, 807.5 g DTB is heated to 350° F., 42.5 g GTR is added to the DTB and stirred for one minute until all the dry GTR is incorporated into the DTB. The total mixture is poured into a lab size reactor. 30 Cfm of air at 2 psi is injected into the reactor through a stationary air spider located at the bottom of the vessel. The reactor is heated and maintained at 485° F. Samples are pulled every 30 minutes after the air inflow is initiated. At a targeted 130° F. softening point, the air and heat are shut off. The material is drained into a sample can and tested. The physical characteristics of the material produced are shown in Table 1, below.

TABLE 1

| TESTS | PAVING RESULTS | ASTM METHOD |
|---|---|---|
| Softening Point, °F. | 131° F. | ASTM D36 |

TABLE 1-continued

| TESTS | PAVING RESULTS | ASTM METHOD |
|---|---|---|
| Penetration at 77° F. 100 g, 5 sec, dmm | 68 | ASTM D5 |
| Flash point °F., COC | 585° F. | ASTM D92 |
| Viscosity at 140° F. (poises) | 8500 ps | ASTM D2171 |
| Ductility at 39.2° F. 5 cm/min, cm | 6.5 cm | ASTM D113 |
| Storage Stability 48 hrs at 325° F. Softening Point difference between Top and Bottom | 1.5% | Texas Item 300 |
| Brookfield Viscosity, at 325° F. (poises) | 3.25 ps | Florida 336-1 |
| Storage Stability Long Term, 30 days at 325° F. difference between Top and Bottom | 3.0% | Texas Item 300 |

EXAMPLE 2

2550 g DTB is heated to 350° F. 850 g GTR is added to the DTB and stirred for 2 minutes until the GTR is completely wetted and incorporated into the DTB. The mixture is poured into a large lab size reactor. 130 cfm of air at 2 psi is injected into the reactor via a stationary air spider located at the bottom of the vessel. The reactor is heated and maintained at 475° F. Samples are pulled every 30 minutes after initiating the air flow. After the mixture is incorporated and the GTR is absorbed in the DTB, the process is shutdown. The material is drained into a sample can and tested. The physical characteristics are as follows.

TABLE 2

| TESTS | ROOFING RESULTS | ASTM METHOD |
|---|---|---|
| Softening Point, °F. | 240° F. | ASTM D36 |
| Penetration at 77° F. 100 g, 5 sec, dmm | 18 | ASTM D5 |
| Flash point °F., COC | 585° F. | ASTM D92 |
| Viscosity at 140° F. (poises) | N/A | ASTM D2171 |
| Ductility at 39.2° F. 5 cm/min, cm | 1.0 cm | ASTM D113 |
| Storage Stability 48 hrs at 400° F. Softening Point difference between Top and Bottom | 1.0% | Texas Item 300 |
| Brookfield Viscosity, at 400° F., poises | 81.45 ps | Florida 336-1 |
| Storage Stability Long Term, 30 days at 400° F. difference between Top and Bottom | 1.0% | Texas Item 300 |

EXAMPLE 3

70.4 tons DTB is heated to 350° F. 9.6 tons GTR is added to the DTB through a wetting vessel. GTR is added into the top of the vessel using a top mounted tank mixer to pull the dried GTR into the DTB. The wetting process takes approximately 1.5 hours until the entire amount of GTR is incorporated into the DTB. The mixture is transferred into an absorption reactor. 2200 cfm of air at 10 psi is injected into the bottom of the reactor via a stationary air spider located at the bottom of the vessel. The air volume and pressure is maintained throughout the entire process. The vapor recovery incinerator is maintained at 1500° F. throughout the entire process. The reactor is heated and maintained at 470° F. Samples are pulled every 30 minutes after the process has been operating for two hours. At a targeted 130° F. softening point, the air and heat are shut off and the process is completed. The softening point is achieved after 3 hours and 25 minutes. The finished material is pumped into a holding vessel for shipment and tested. The physical characteristics of the final material are shown in Table 3.

TABLE 3

| TESTS | PAVING RESULTS | ASTM METHOD |
| --- | --- | --- |
| Softening Point, °F. | 135° F. | ASTM D36 |
| Penetration at 77° F. 100 g, 5 sec, dmm | 62 | ASTM D5 |
| Flash point °F., COC | 585° F. | ASTM D92 |
| Viscosity at 140° F., Poises | 8600 ps | ASTM D2171 |
| Ductility at 39.2° F. 5 cm/min, cm | 4.5 cm | ASTM D113 |
| Storage Stability 48 hrs at 325° F. Softening Point difference between Top and Bottom | 1.5% | Texas Item 300 |
| Brookfield Viscosity, at 325° F. (poises) | 6.75 ps | Florida 336-1 |
| Storage Stability Long Term, 30 days at 325° F. difference between Top and Bottom | 2.0% | Texas Item 300 |

The product of each of the three examples described above is a stable, heat resistant product. The same two-step process was used for each example, with different volumes. The absorption is achieved without incorporating any chemicals or additional aromatic oils or additives.

The process yields material suitable for use in both roofing and paving industries. The different materials have a different proportion of GTR loading in the DTB and a different time of abrasive absorption to achieve the different properties required in the final materials.

About 1-5% of a polymer material such as synthetic rubber is capable of being incorporated together with the GTR into the DTB. Examples of synthetic materials are styrene-butadiene-styrene (SBS), styrene-butadiene-rubber (SBR), polyethylene, polyisoprene, polybutylene, polychloroprene (neoprene), nitrile rubber (acrylonitrile butadiene), butyl rubber (copolymer of isobutylene and isoprene) polyacrylonitrile and other materials known to one skilled in the art.

If an insufficient quantity of air is used or if the residence time in the abrasive absorption vessel is insufficient, the product is not properly incorporated and thus is liable to separate out.

While the invention has been described above with respect to certain embodiments thereof, it will be appreciated by one skilled in the art that variations and modifications may be made without departing from the spirit and scope of the invention.

What is claimed is:

1. A process for preparing an incorporated asphalt composition consisting essentially of the steps of:
    A. mixing ground tire rubber with distillation tower bottoms to form a wetted mixture of the ground tire rubber with the distillation tower bottoms;
    B. bombarding the wetted mixture of ground tire rubber and distillation tower bottoms with air at a temperature of about 350°-485° F. at about 6-15 psi pressure;
    C. abrasively absorbing the ground tire rubber into the distillation tower bottoms until the mixture is homogenized and a stable incorporated asphalt composition is formed;
    D. recovering the incorporated asphalt composition.

2. A process according to claim 1 wherein about 1-27% ground tire rubber is mixed into about 73-99% distillation tower bottoms.

3. A process according to claim i wherein about 12-25% ground tire rubber is mixed into about 75-88% distillation tower bottoms.

4. A process according to claim 1 wherein the air bombardment is carried out for about 2-6 hours.

5. A process according to claim 1 wherein the air bombardment is carried out at about 1600-2800 cfm.

6. A process according to claim 1 wherein the air bombardment is carried out at about 2000-2400 cfm.

7. A process according to claim 1 wherein the air for bombarding the wetted mixture is injected through a stationary spider-shaped injector device.

8. A process according to claim 1 wherein the ground tire rubber includes at least one rubber selected from the group consisting of natural rubber and synthetic rubber.

9. A process for preparing an incorporated asphalt composition consisting essentially of the steps of:
    B. injecting air at a temperature of about 350°-485° at a flow rate of about 1600-2800 cfm and about 6-15 psi pressure for about 2 to 6 hours through a stationary spider-shaped device;
    C. bombarding the wetted mixture of ground tire rubber and distillation tower bottoms with the injected air;
    D. abrasively absorbing the ground tire rubber into the distillation tower bottoms until the mixture is incorporated;
    E. recovering the incorporated asphalt composition.

10. A process according to claim 9 wherein the ground tire rubber includes at least one rubber selected from the group consisting of natural rubber and synthetic rubber.

11. An incorporated asphalt composition consisting essentially of about 1-27% ground tire rubber incorporated into about 73-99% distillation tower bottoms.

12. An incorporated asphalt composition according to claim 11 consisting essentially of about 12-25% ground tire rubber incorporated into about 75-88% distillation tower bottoms.

13. An incorporated asphalt composition according to claim 11, wherein the ground tire rubber includes synthetic rubber.

14. An incorporated asphalt composition made by a process according to claim 1.

15. An incorporated asphalt composition made by a process according to claim 8.

* * * * *

UNITED STATES PATENT AND TRADEMARK OFFICE
CERTIFICATE OF CORRECTION

PATENT NO. : 5,397,818
DATED : March 14, 1995
INVENTOR(S) : Theodore P. Flanigan It is certified that error appears in the above-indentified patent and that said Letters Patent is hereby corrected as shown below:

Column 6, line 30-60

9. A process for preparing an incorporated asphalt composition consisting essentially of the steps of:

A. mixing about 12-25% ground tire rubber with about 75-88% distillation tower bottoms to form a wetted mixture of the ground tire rubber with the distillation tower bottoms;

B. injecting air at a temperature of about 350°-485° at a flow rate of about 1600-2800 cfm and about 6-15 psi pressure for about 2 to 6 hours through a stationary spider-shaped device;

C. bombarding the wetted mixture of ground tire rubber and distillation tower bottoms with the injected air;

D. abrasively absorbing the ground tire rubber into the distillation tower bottoms until the mixture is incorporated;

E. recovering the incorporated asphalt composition.

Signed and Sealed this

Twenty-ninth Day of August, 1995

Attest:

BRUCE LEHMAN

*Attesting Officer*      *Commissioner of Patents and Trademarks*